(12) United States Patent
Bahnmiller

(10) Patent No.: US 9,359,153 B2
(45) Date of Patent: Jun. 7, 2016

(54) GRAIN BIN VACUUM TUBE EXTENSION SYSTEM FOR EVACUATING GRAIN FROM A GRAIN BIN

(71) Applicant: Steven L. Bahnmiller, Big Sandy, MT (US)

(72) Inventor: Steven L. Bahnmiller, Big Sandy, MT (US)

(73) Assignee: Steven L. Bahnmiller, Big Sandy, MT (US)

( * ) Notice: Subject to any disclaimer, the term of this patent is extended or adjusted under 35 U.S.C. 154(b) by 189 days.

(21) Appl. No.: 14/304,813

(22) Filed: Jun. 13, 2014

(65) Prior Publication Data

US 2015/0359180 A1 Dec. 17, 2015

(51) Int. Cl.
*B65G 65/40* (2006.01)

(52) U.S. Cl.
CPC ....................... *B65G 65/40* (2013.01)

(58) Field of Classification Search
CPC .................................................. A01F 25/2018
USPC ............. 251/901, 294, 296, 305; 137/599.03, 137/599.01, 637, 627.5, 637.1, 607, 682; 198/428; 406/127–133, 152, 151, 141
See application file for complete search history.

(56) References Cited

U.S. PATENT DOCUMENTS

| | | | | |
|---|---|---|---|---|
| 1,184,151 A * | 5/1916 | Tulley | ............... | B65G 53/42 406/152 |
| 2,602,878 A * | 7/1952 | Holody | ............... | B60H 1/00007 137/544 |
| 2,813,758 A * | 11/1957 | Sayre | ............... | B61D 5/006 406/130 |
| 2,970,865 A * | 2/1961 | Finnegan | ............... | B65G 53/42 406/152 |
| 3,991,913 A | 11/1976 | Steffen | | |
| 4,123,114 A | 10/1978 | Rataj et al. | | |
| 4,284,371 A * | 8/1981 | Paulson | ............... | A01C 3/02 406/107 |
| 4,669,941 A | 6/1987 | West et al. | | |
| 5,511,925 A * | 4/1996 | Muth | ............... | B65G 65/466 198/550.6 |
| 6,497,545 B1 * | 12/2002 | Simrose | ............... | A01F 25/2018 198/532 |
| 7,588,405 B2 * | 9/2009 | Johnson | ............... | B65G 21/02 198/823 |
| 8,544,468 B2 * | 10/2013 | Arnott | ............... | A61M 16/20 128/200.24 |
| 2005/0158155 A1 | 7/2005 | Johnson et al. | | |
| 2007/0264926 A1 | 11/2007 | Sonntag | | |
| 2013/0223960 A1 | 8/2013 | Schoenfeld et al. | | |

* cited by examiner

*Primary Examiner* — Marina Tietjen
*Assistant Examiner* — Daphne M Barry
(74) *Attorney, Agent, or Firm* — Antoinette M. Tease

(57) ABSTRACT

A grain bin vacuum tube extension system with (i) an extension tube comprising a bottom surface and a plurality of slots on the bottom surface of the extension tube, (ii) a sealing strip that is slidably secured to the bottom surface of the extension tube and that comprises a plurality of slots, and (iii) a butterfly valve that is configured to close when the slots on the bottom surface of the extension tube are aligned with the slots in the sealing strip and to open when the slots on the bottom surface of the extension tube are not aligned with the slots in the sealing strip. The sealing strip is slidably secured to the bottom surface of the extension tube such that the slots on the bottom surface of the extension tube align with the slots in the sealing strip when the sealing strip is slid to an open position. The sealing strip creates and airtight seal against the bottom surface of the extension tube when the butterfly valve is in an open position.

4 Claims, 20 Drawing Sheets

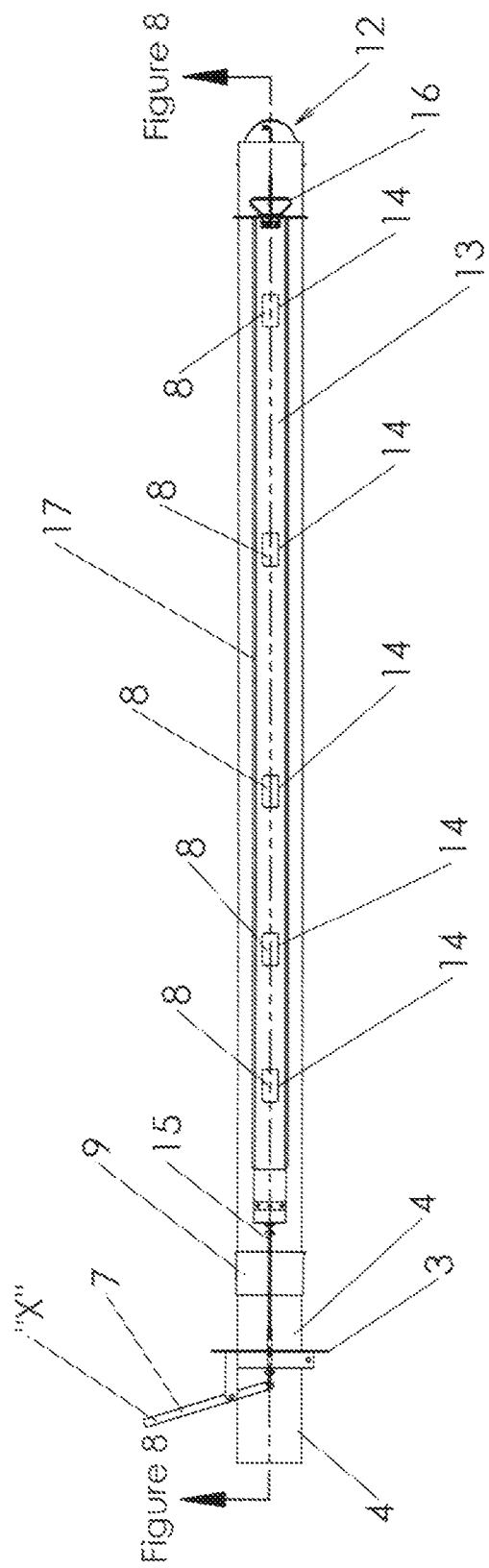

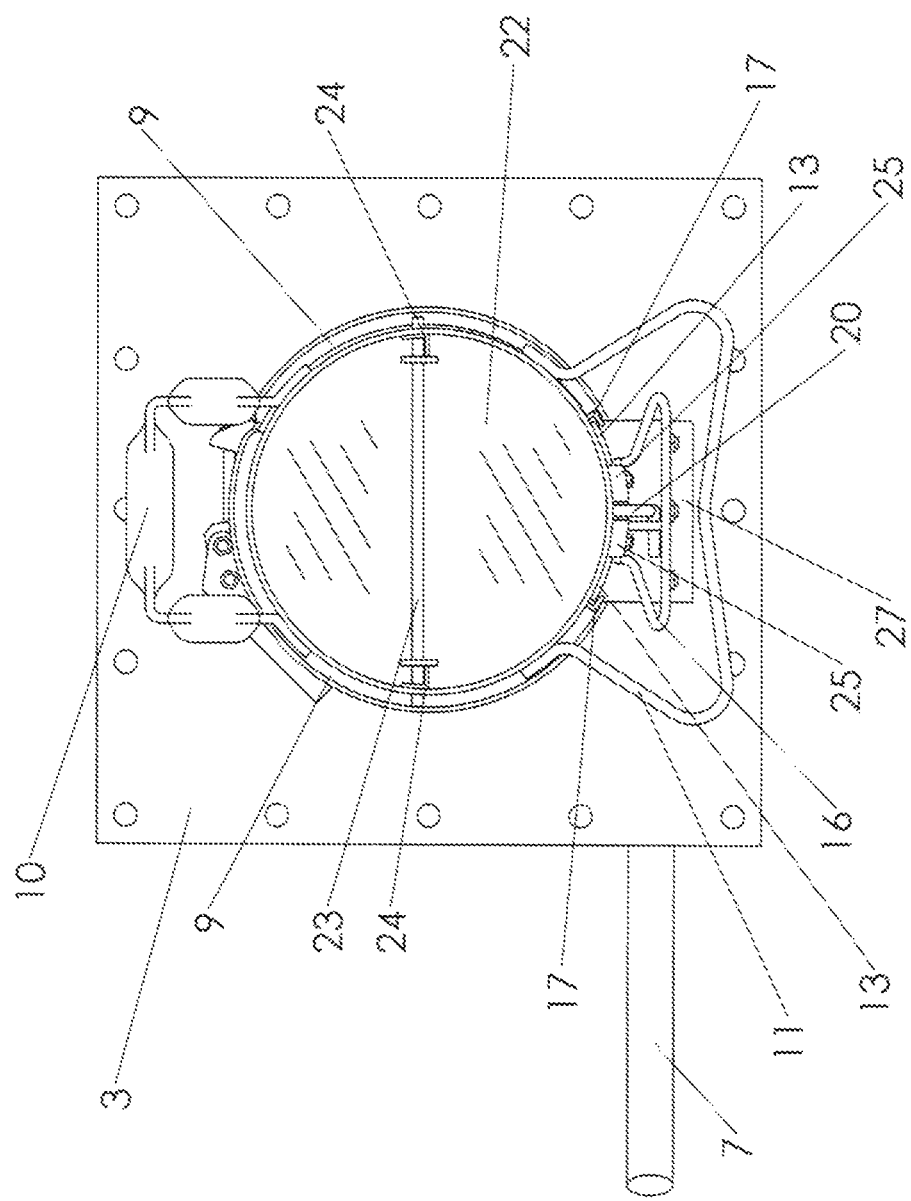

GRAIN BIN VACUUM TUBE EXTENSION SYSTEM FOR EVACUATING GRAIN FROM A GRAIN BIN

BACKGROUND OF THE INVENTION

1. Field of the Invention

The present invention relates generally to the field of grain bins, and more specifically, to a grain bin vacuum tube extension system for evacuating grain from a grain bin.

2. Description of the Related Art

A variety of methods and structures are commonly used to store and move grain or other bulk materials. One well-known method is the use of an circular structure composed of corrugated metal; this circular structure is known in the industry as a "grain bin." These bins vary in size depending on the use, crops grown, and location. It is generally accepted knowledge in the farming industry that a grain bin should be emptied from the center so as not to cause itself to buckle or collapse due to uneven pressure on the outside wall from the material within the bin.

Removing grain from these structures is typically a time-consuming task. One method for emptying these bins is to use an auger placed directly in the bin entrance door. Another method uses auger tubes buried beneath the surface of the bin floor transfer grain to another device. Yet another method involves the use of grain vacuums with tubes that are inserted through a bin door or boot structure. These vacuums operate by creating negative pressure in a chamber outside of the bin. Once the grain has been vacuumed out of the bin and into the chamber, it is then elevated from (out of) the chamber by various means.

There are certain deficiencies to using these methods to remove grain from the bin structures. Augers are heavy, ungainly devices and are hard to move, particularly over terrain. Augers have many pinch points and can be dangerous. If inserted through a door, an auger will remove grain from an area not in the bin center, causing uneven pressure on the outside bin wall.

Grain vacuums have gained in popularity due to the ease with which they are set up and moved. These vacuums also move bulk materials with great speed. They do, however, depend upon the removal of grain directly at the point of the bin door, which will cause uneven pressure on the outside bin wall. The resultant pressure limits the size of bins that can be unloaded in this manner. Once grain is removed from the area immediately around the bin entrance door, access to the inside of the bin is gained. The grain vacuum pipe extensions are then run through the bin door and added as needed. Access by persons to the inside of the bin is them hampered as one is continually stepping over and around such pipes.

The following patents address systems and methods for evacuating grain from a grain bin. U.S. Pat. No. 3,991,913 (Steffen, 1976) provides a port with a sliding gate for allowing grain to flow out of a bin by gravity for the express purpose of sampling the grain.

U.S. Pat. No. 4,123,114 (Rataj el al., 1978) involves the use of pneumatic pressure as a means for conveying bulk particulate material to another conveying means. The invention comprises floating and conveying channels situated beneath the material-supporting upper surface of the floor.

U.S. Pat. No. 4,669,941 (West et al., 1987) describes a floor sweep grain auger system in which a stationary auger is secured to the bin floor and a moveable auger pivots around the stationary auger to mechanically move grain. The movable auger has a pivot axis that allows it to move from a position parallel and adjacent to one side of the stationary auger and to swing through a 360-degree arc to a terminal position parallel and adjacent to the opposite side of the auger.

U.S. Pat. No. 7,588,405 (Johnson et al., 2009) discusses the mechanical movement of grain by means of a conveyor belt. The belt is designed to transport the grain with a minimization of friction, trauma or interaction between the grain to maintain quality of the grain.

U.S. Patent Application Pub. No. 2007/0264926 (Sonntag) provides a device and method for transferring grain from a grain bin with a grain transfer tube and a blower positioned at the grain bin inlet. A suction hose coupled to the grain bin outlet creates a vacuum force for drawing the grain the grain bin into the tube and then propelling it along the tube to a remote location outside of the bin.

U.S. Patent Application Pub. No. 2013/0223960 (Schoenfeld et al.) discloses a system and method for discharging grain from a bin in which the grain is gravity fed into awaiting grain tucks or rail cars without the use of a grain auger and without relying on outside energy sources. The invention includes an optional grain agitator for installation within the grain bin.

No other invention teaches the use of a vacuum tube extension fitted with an airtight seal, as in the present invention. Furthermore, none of the prior art references includes a means for transferring negative pressure from one point to another within the vacuum tube extension or for evacuating material from underneath the vacuum tube extension. Lastly, no prior art device allows the vacuum tube extension to be removed from the outlet port and replaced with standard grain vacuum attachments via an over-center band clamp.

BRIEF SUMMARY OF THE INVENTION

The present invention is a grain bin vacuum tube extension system comprising: an extension tube comprising a bottom surface and a plurality of slots on the bottom surface of the extension tube; a rubber seal that is slidably secured to the bottom surface of the extension tube and that comprises a plurality of slots, wherein the rubber seal is slidably secured to the bottom surface of the extension tube such that the slots on the bottom surface of the extension tube align with the slots in the rubber seal when the rubber seal is slid to an open position; and (c) a butterfly valve that is configured to close when the slots on the bottom surface of the extension tube are aligned with the slots in the rubber seal and to open when the slots on the bottom surface of the extension tube are not aligned with the slots in the rubber seal. In a preferred embodiment, the invention further comprises: an outlet tube that extends through a wall in a grain bin; and an over-center band clamp that connects the extension tube to the outlet tube.

In a preferred embodiment, the invention further comprises a pull rod assembly comprising a gate opening actuating lever that is attached to a gate opening actuating rod, wherein the gate opening actuating rod is attached to a first end of the sealing strip, and wherein the gate opening actuating rod passes through a wall of the grain bin; and a return handle that is attached to a second end of the sealing strip; wherein when the gate opening actuating lever is activated, the gate opening actuating rod causes the sealing strip to move longitudinally toward the wall of the grain bin through which the gate opening actuating rod passes, thereby aligning the slots in the sealing strip with the slots in the bottom surface of the extension tube and closing the butterfly valve; and wherein when the return handle is pulled toward a distal end of the extension tube, the sealing strip slides longitudinally toward the distal end of the extension tube, thereby opening the butterfly valve and causing the slots in the sealing strip to not be in alignment with the slots in the bottom surface of the extension tube. The invention preferably further comprises a butterfly valve actuating rod with a first end and a second end, wherein the first end of the butterfly valve actuating rod is connected to an elliptical disc situated inside of the extension tube on a distal end of the extension tube, and wherein the second end of the butterfly valve actuating rod is connected to a second end of the sealing strip.

In a preferred embodiment, when the butterfly valve is in a closed position, a gap remains between the elliptical disc and an inside bottom surface of the extension tube through which gain is evacuated. The invention preferably further comprises a stop bracket situated on an interior surface of the distal end of the extension tube, wherein the stop bracket prevents the elliptical disc from over-rotating when the butterfly valve is returned to an open position via the return handle. The invention preferably further comprises at least one retaining bracket on the bottom surface of the extension tube to prevent the sealing strip from sliding toward the distal end of the extension tube once the butterfly valve is returned to an open position via the return handle and the butterfly valve actuating rod.

In a preferred embodiment, the invention further comprises at least one grab handle situated on a top surface of the extension tube. In another preferred embodiment, the invention further comprises a stand that is situated on a bottom surface of the extension tube at a distal end of the extension tube. The sealing strip creates and airtight seal against the bottom surface of the extension tube when the butterfly valve is in an open position.

BRIEF DESCRIPTION OF THE DRAWINGS

FIG. 7A is a bottom perspective view of the present invention showing where the section view of FIG. 8 is taken.

FIG. 19 is a plan view of the distal (inward-most) end of the present invention shown with the butterfly valve in a closed position.

REFERENCE NUMBERS

Figure 1:
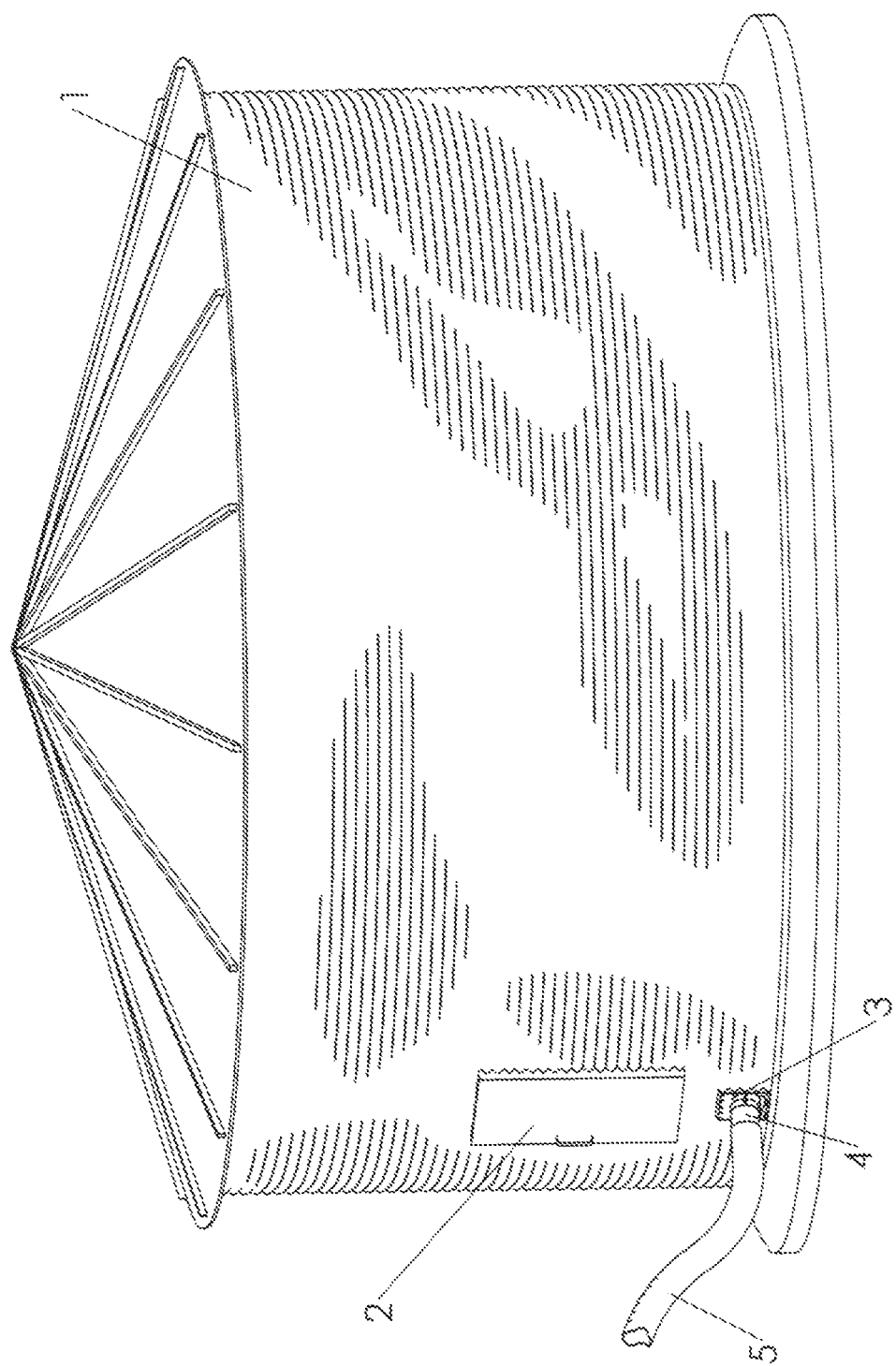
FIG. 1 is a perspective view of a grain bin with the grain vacuum hose attached to it.

1 Grain bin
2 Door (of grain bin)
3 Reinforcement plate
4 Outlet tube
5 Grain vacuum hose
6 Cap (on outlet tube)
7 Gate opening actuating lever
8 Extension tube
9 Over-center band clamp
10 Grab handle
11 Stand
12 Butterfly valve
13 Sealing strip
14 Gates (or slots) in sealing strip
15 Gate opening actuating rod/pull rod
16 Return handle
17 Lip
18 Collar
19 Slots (in bottom of extension tube)
20 Butterfly valve actuating rod
21 Connecting bracket
22 Elliptical disc
23 Shaft
24 Stop bracket
25 Retaining bracket
26 Supporting bracket
27 Metal connector
28 Pin

DETAILED DESCRIPTION OF INVENTION

A. Overview

The present invention offers numerous structural and functional advantages over known grain bin vacuum tube extensions. First, the present invention utilizes an over-center band clamp to connect the outlet tube, which penetrates through the bin wall, to the extension tube, which extends from the outlet tube toward the center of the bin. This over-center band clamp allows the extension tube to be detached from the outlet tube and removed from the inside of the grain bin once the grain is drained from it. Standard grain vacuum attachments can be secured to the outlet tube inside of the bin with the same over-center band clamp (and in lieu of the extension tube). The grain vacuum itself is attached to the outlet tube on the outside of the bin wall; therefore, with the present invention, all standard grain vacuum attachments are changed inside of the bin as opposed to outside of the bin.

Second, the invention incorporates a vacuum-tight seal that slides on the outside of a plurality of slots located on the bottom of the extension tube. The extension tube also comprises a mechanism (in the form of a butterfly valve) for transferring negative pressure from the inward-most tube end to the slots on the tube bottom.

Third, in a preferred embodiment, the extension tube has a stand attached to its bottom side to enable it to be placed at a certain distance over the bin floor. The outlet tube is configured to penetrate the bin wall at roughly the same height over the bin floor as the stand on the extension tube. This allows for the grain to flow around the outside of the bottom of the extension tube, where it is evacuated from the bin via the slots on the bottom side of the extension tube.

In sum, the present invention is not only more efficient and effective at evacuating grain than prior art devices, but it also allows bins to be emptied from full capacity at a point near their center so as to avoid the exertion of uneven pressure on the bin wall. The present invention is described more fully below in reference to the figures.

B. Detailed Description of the Figures

Figure 3:
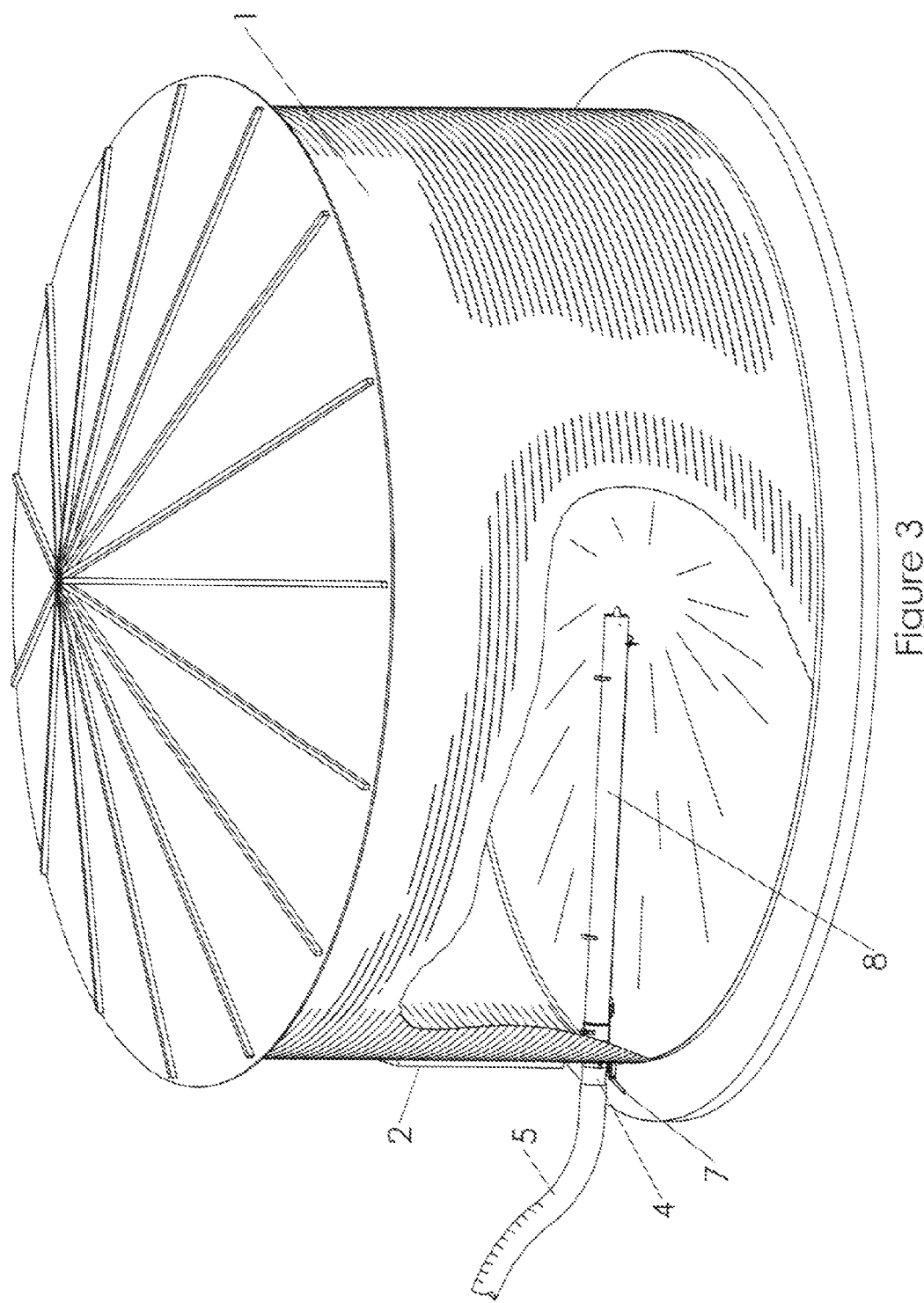
FIG. 3 is a cutaway perspective view of a grain bin with the present invention attached to it.

FIG. 1 is a perspective view of a grain bin with the grain vacuum hose attached to it. This figure shows a typical grain bin 1 with a door 2. The reinforcement plate 3 of the present invention is preferably situated directly beneath the door 2 a certain distance from the floor of the grain bin 1 (i.e., between the door 2 and the floor of the grain bin 1). The outlet tube 4 extends through the reinforcement plate 3 and penetrates through the wall of the grain bin 1, as shown in FIG. 3, so that part of the outlet tube 4 extends outwardly from the outer surface of the grain bin wall and part of the outlet tube 4 extends inwardly from the inside surface of the grain bin wall. A grain vacuum hose 5 is attached to the outlet tube 4.

Figure 2:
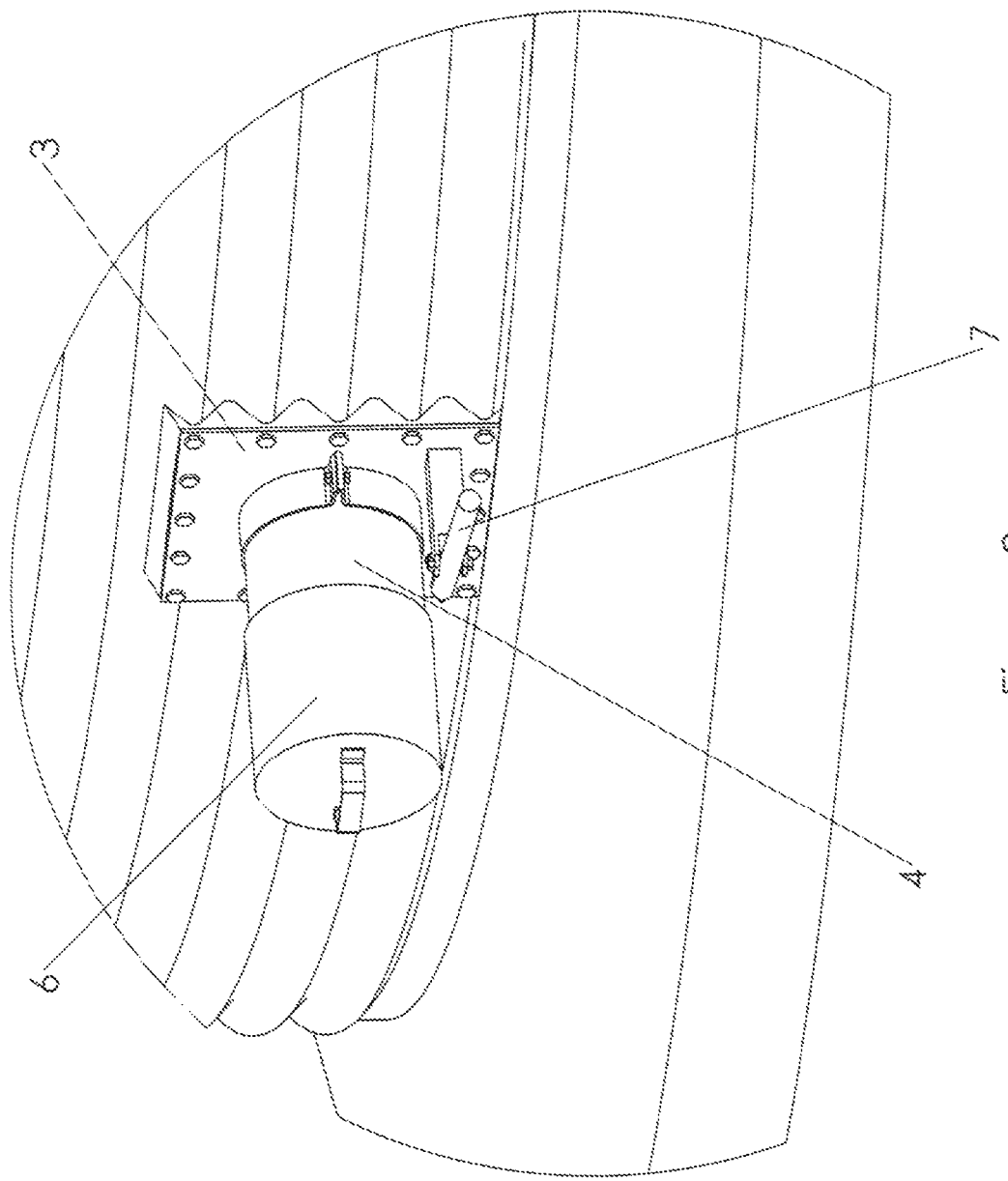
FIG. 2 is a detail perspective view of the reinforcement plate, outlet tube and gate opening actuating lever of the present invention.

FIG. 2 is a detail perspective view of the reinforcement plate, outlet tube and pull handle of the present invention. When the grain vacuum hose 5 is not attached to the outlet tube 4, the outside end of the outlet tube 4 is preferably covered with a cap 6 to prevent dirt, debris, precipitation and rodents from entering the grain bin 1 through the outlet tube 4. The gate opening actuating lever 7 is part of a pull rod assembly that is shown in greater detail in FIGS. 14 and 15.

FIG. 3 is a cutaway perspective view of a grain bin with the present invention attached to it. As shown in this figure, an extension tube 8 is attached to the outlet tube 4 on the inside of the grain bin 1 and extends to roughly the center of the grain bin 1. The extension tube 8 is shown in greater detail in subsequent figures.

Figure 4:
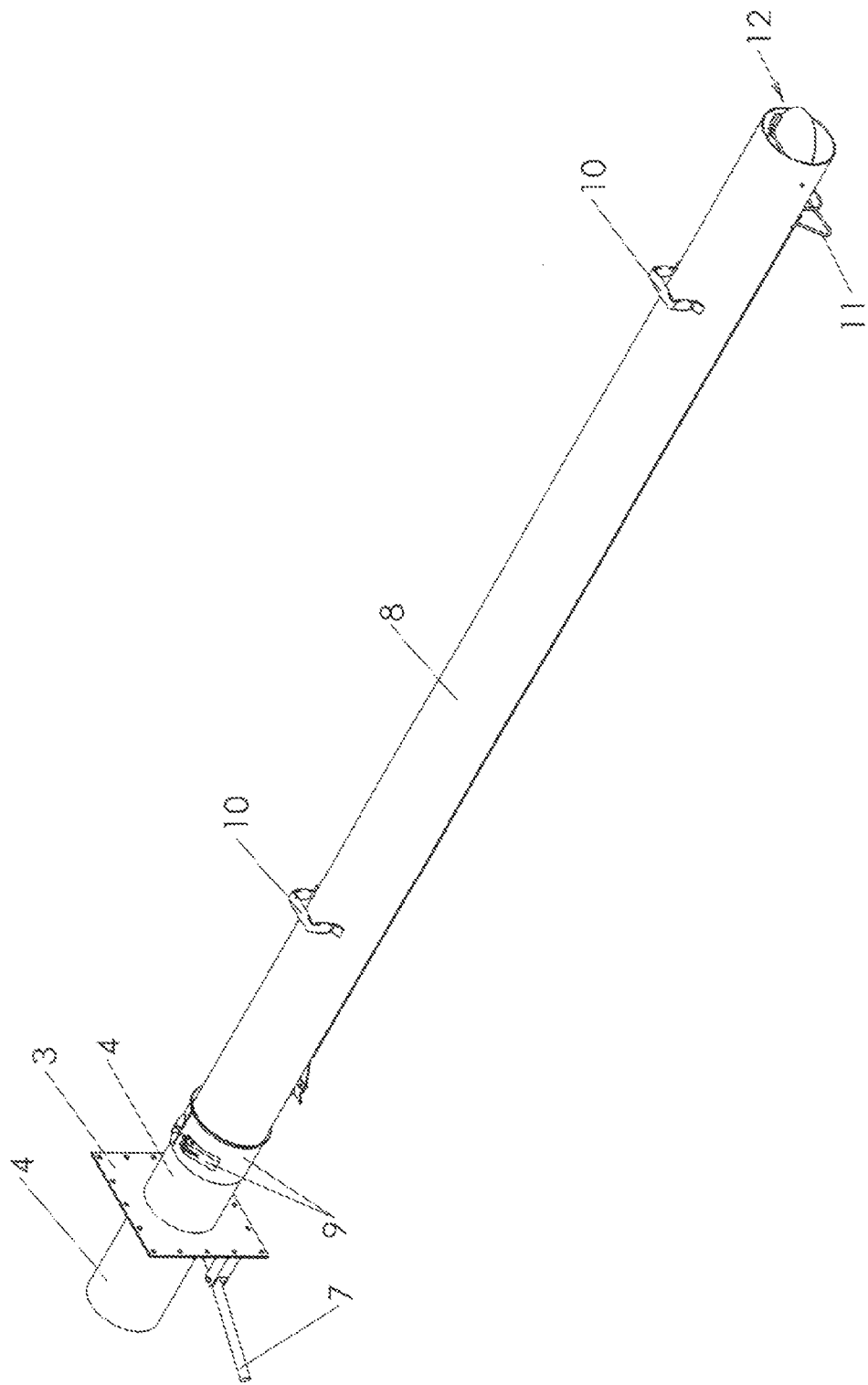
FIG. 4 is a top perspective view of the present invention shown with the butterfly valve in an open position.

FIG. 4 is a top perspective view of the present invention shown with the butterfly valve in an open position. As shown in this figure, the extension tube 8 is secured to the outlet tube 4 with an over-center band clamp 9. Grab handles 10 are preferably situated on the top surface of the extension tube 8 to make it easier to grab and move (or remove) the extension tube 8. A stand 11 is situated on the bottom of the extension tube 8 at its distal (inward-most) end. The purpose of the stand 11 is to maintain the extension tube 8 a certain distance from the floor of the grain bin so that grain can flow underneath the extension tube 8, where it is sucked up through the gates/slots shown in FIG. 6. A butterfly valve 12 is located inside the extension tube 8 at its distal end. The butterfly valve 12 is controlled by the sliding action of the flexible seal, as described below.

Figure 5:
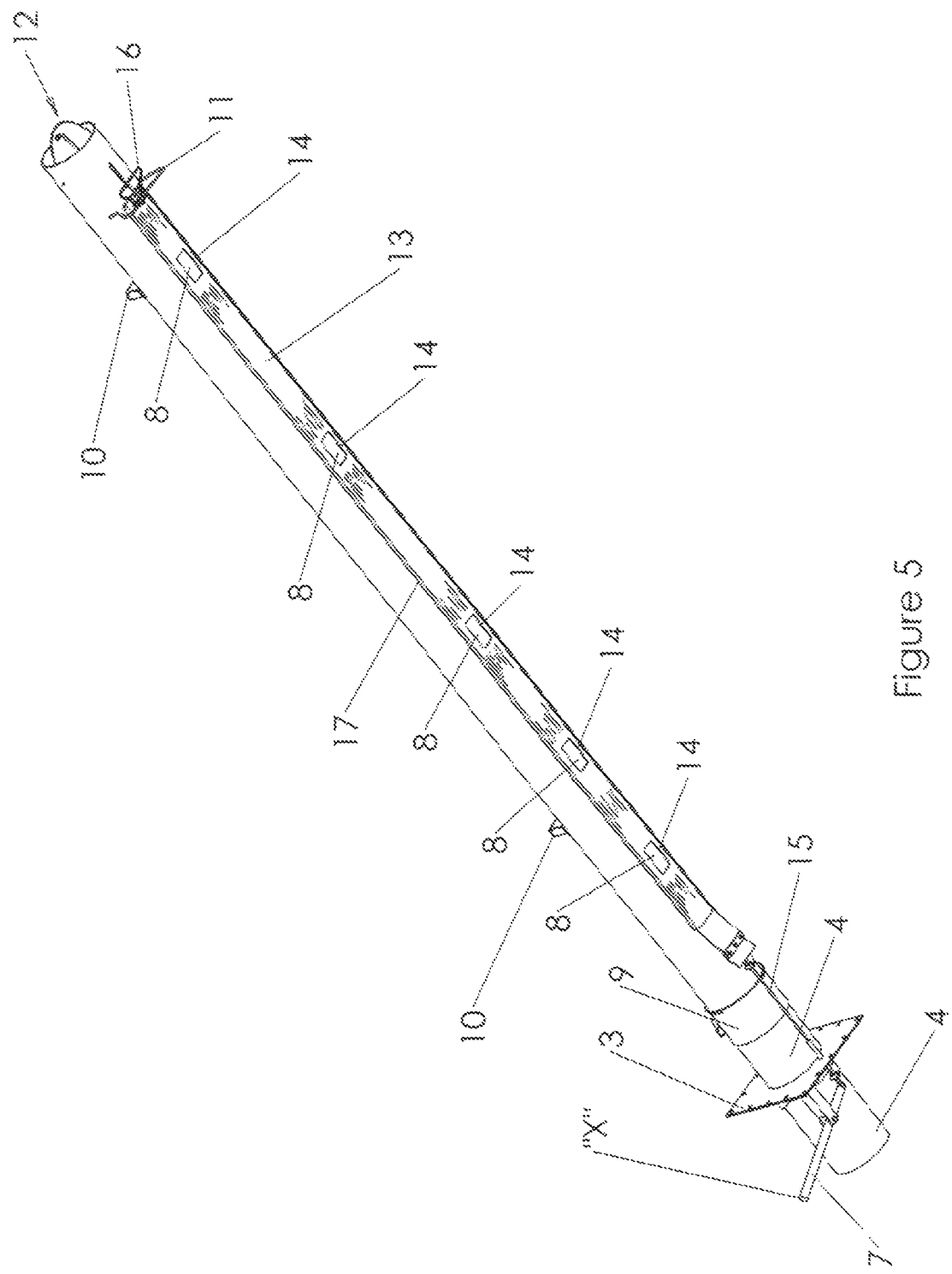
FIG. 5 is a bottom perspective view of the present invention shown with the butterfly valve in an open position and the gates in a closed position.

FIG. 5 is a bottom perspective view of the present invention shown with the butterfly valve in an open position and the gates in a closed position. As shown in this figure, the invention comprises a sealing strip 13 with slots (or gates) 14 in it; this sealing strip 13 is moved longitudinally (i.e., toward one end or the other of the extension tube 8) via the gate opening actuating rod (or pull rod) 15 and the return handle 16. The sealing strip 13 creates an airtight seal when the gates are in a closed position (as shown in FIG. 5). The sealing strip 13 is held in place on the bottom of the extension tube 8 with two parallel lips 17 that extend along both longitudinal sides or lengths of the sealing strip 13. In a preferred embodiment, the sealing strip 13 is comprised of a nylon core with a rubber coating; however, the sealing strip 13 could be made of any material that is durable, flexible, creates an airtight seal against the bottom surface of the extension tube, and has good lateral (to withstand the vacuum across the slots in the extension tube) and longitudinal (to withstand the pull exerted to open the gates and close the butterfly valve) stability. Examples of suitable materials include rubber, plastic, polyvinyl chloride, nylon and polyester.

Figure 6:
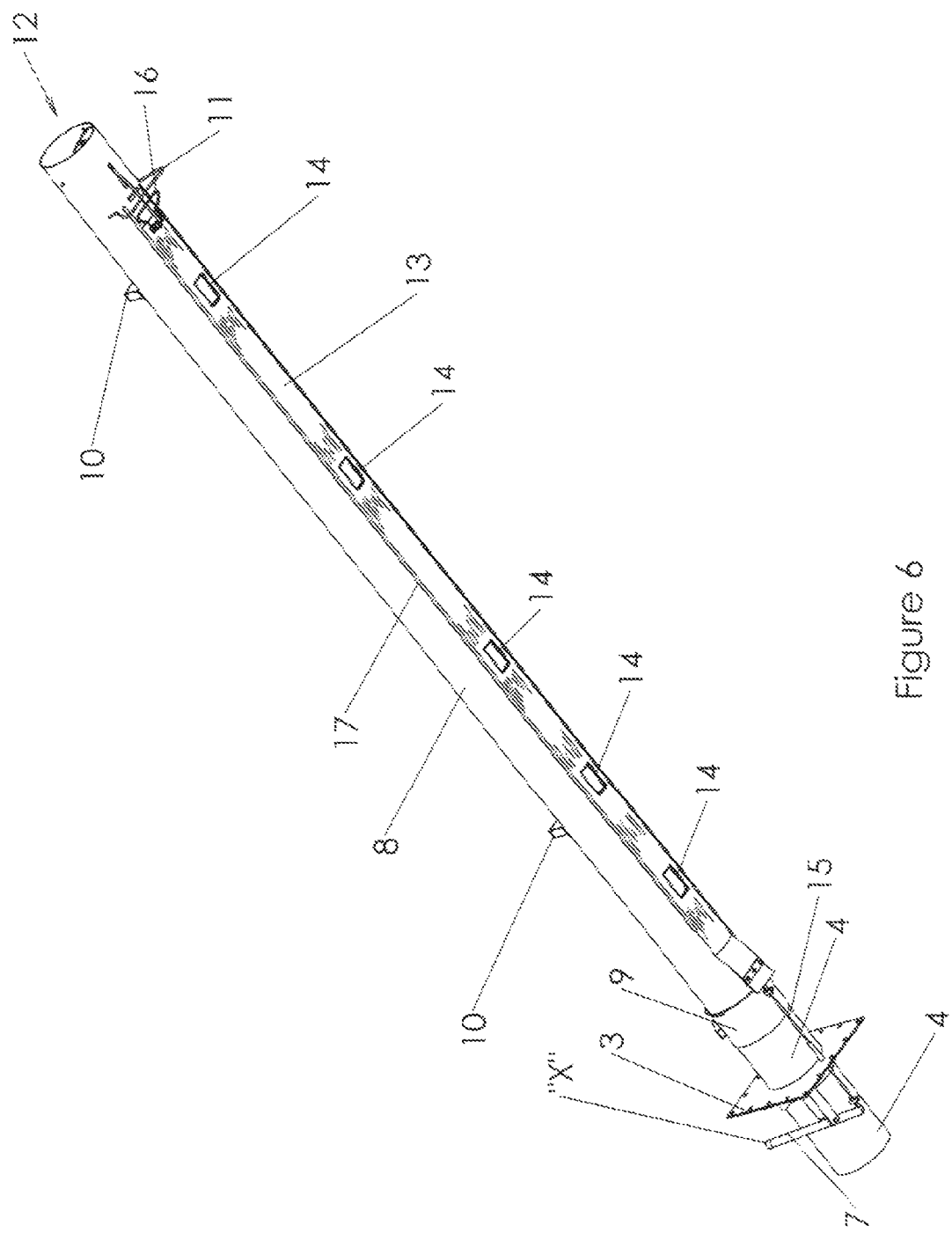
FIG. 6 is a bottom perspective view of the present invention shown with the butterfly valve in a closed position and the gates in an open position.

FIG. 6 is a bottom perspective view of the present invention Shown with the butterfly valve in a closed position and the gates in an open position. When the first end ("X" in FIGS. 5 and 6) of the gate opening actuating lever 7 is pushed toward the reinforcement plate 3, the second end of the gate opening actuating lever 7 moves away from the reinforcement plate 3. The second end of the gate opening actuating lever 7 is attached to a gate opening actuating rod (or pull rod) 15, which in turn is attached to one end of the sealing strip 13. Note that the gate opening actuating rod 15 passes through die reinforcement plate 3 and the wall of the grain bin beneath the outlet tube 4 (see FIG. 14). A collar 18 (see FIG. 14) surrounds the gate opening actuating rod as it passes through the reinforcement plate 3. When the second end of the gate opening actuating lever 7 moves away from the reinforcement plate 3, the gate opening actuating rod 15 causes the sealing strip 13 to move longitudinally toward the reinforcement plate 3; in other words, the entire sealing strip 13 slides longitudinally toward the proximal (or outward-most) end of the extension tube 8 and away from the distal (or inward-most) end of the extension tube 8, which is situated at the center of the grain bin.

When this happens, the gates or slots 14 in the sealing strip 13 align with slots 19 in the bottom of the extension tube 8 so that when the sealing strip 13 is slid into an open position (as shown in FIG. 6), the slots 14, 19 (see FIG. 11) are aligned with one another to create a plurality of openings in the bottom of the extension tube 8 that allow grain to be sucked up into the extension tube 8 when the grain vacuum is attached to the outlet tube 4 outside of the grain bin and turned on. To close these openings, the return handle 16 on the distal end of the extension tube 8 is pulled toward the distal end of the extension tube 8, thereby causing the sealing strip 13 to slide back into the position shown in FIG. 5. The slots 14, 19 are located on the bottom of the extension tube 8, as opposed to on the top of the extension tube 8, because the pressure of the grain against the rubber seal would be greater on the top of the extension tube than on the bottom, thereby hindering the rubber seal from sliding. In addition, locating the slots on the bottom of the extension tube is preferable because it allows grain to be drawn down below the tube, thus easing removal of the tube once it is exposed.

Figure 7B:
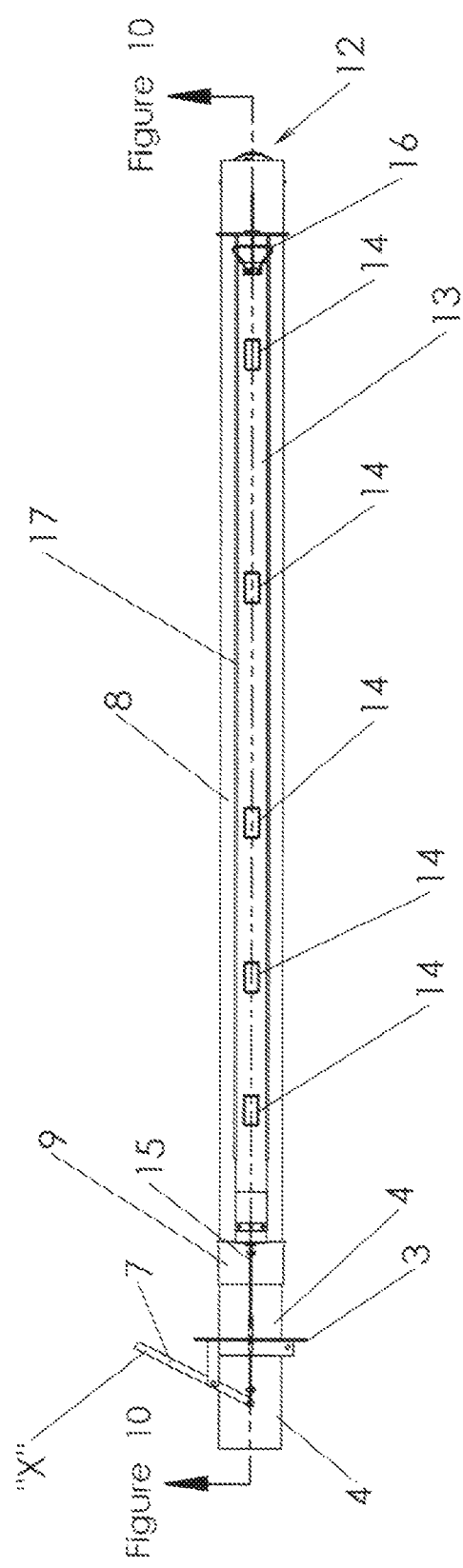
FIG. 7B is a bottom perspective view of the present invention showing where the section view of FIG. 9 is taken.
Figure 8:
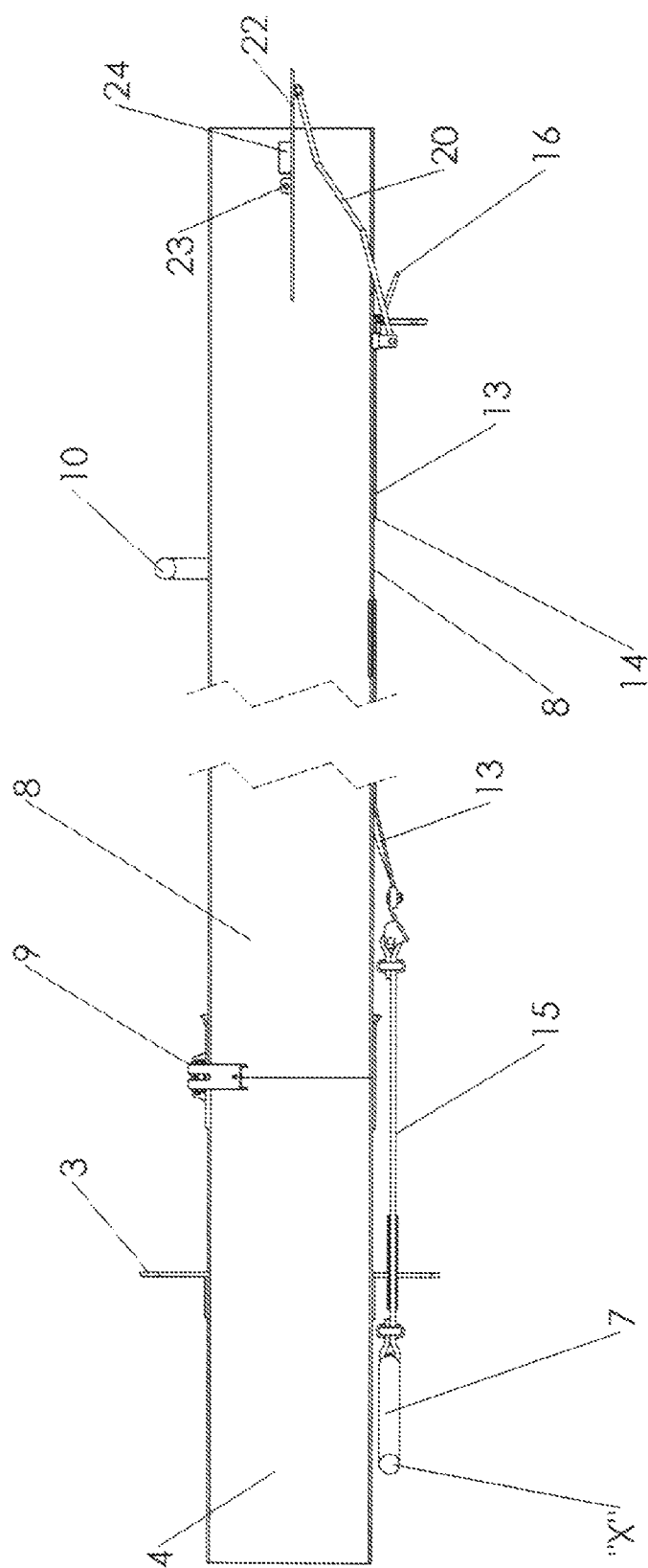
FIG. 8 is a section view of the present invention shown with the butterfly valve in an open position and the gates in a closed position.
Figure 9:
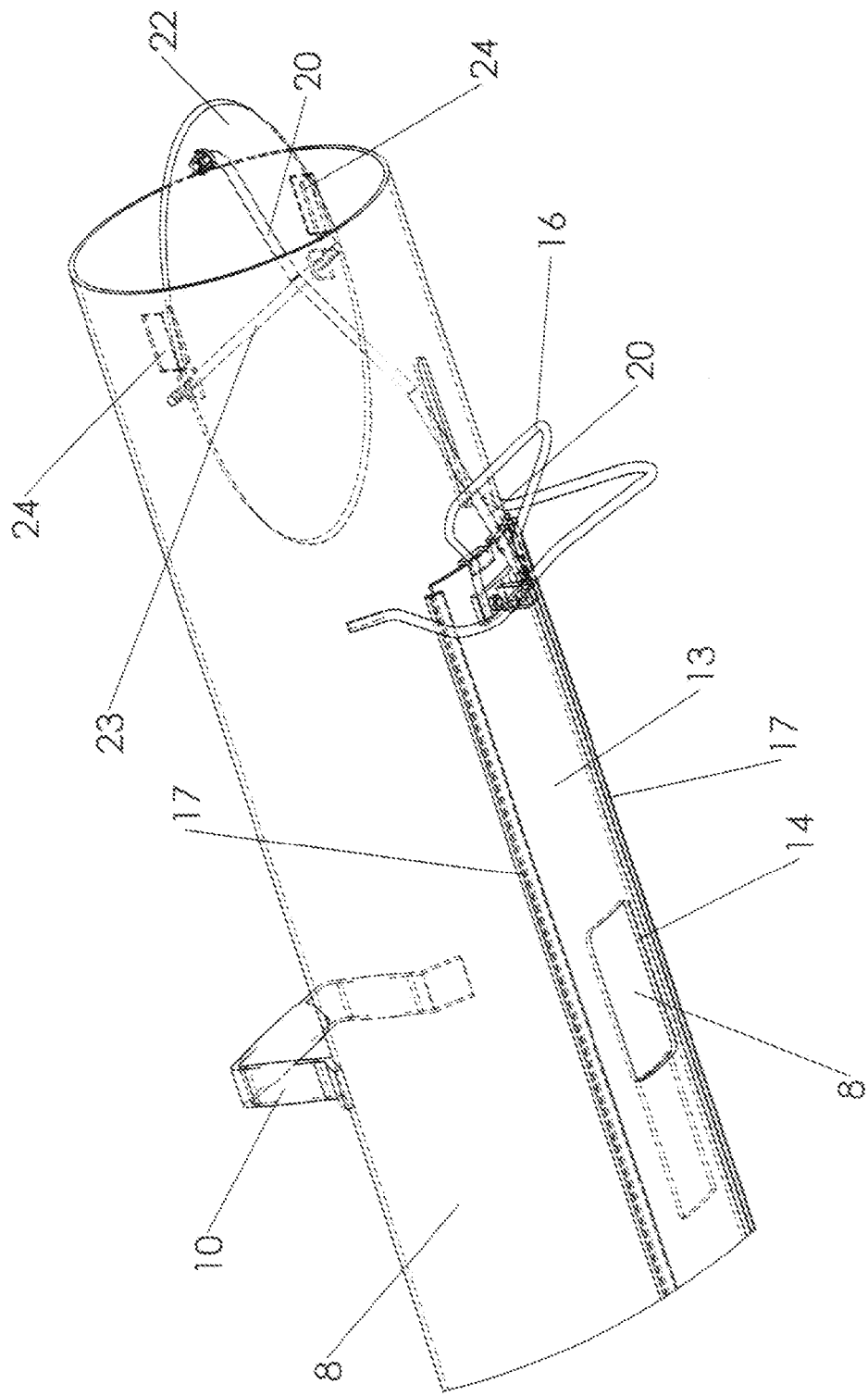
FIG. 9 is a detail perspective view of the distal (inward-most) end of the extension tube shown with the butterfly valve in an open position.

FIG. 7A is a bottom perspective view of the present invention showing where the section view of FIG. 8 is taken, and FIG. 7B is a bottom perspective view of the present invention showing where the section view of FIG. 9 is taken.

Figure 10:
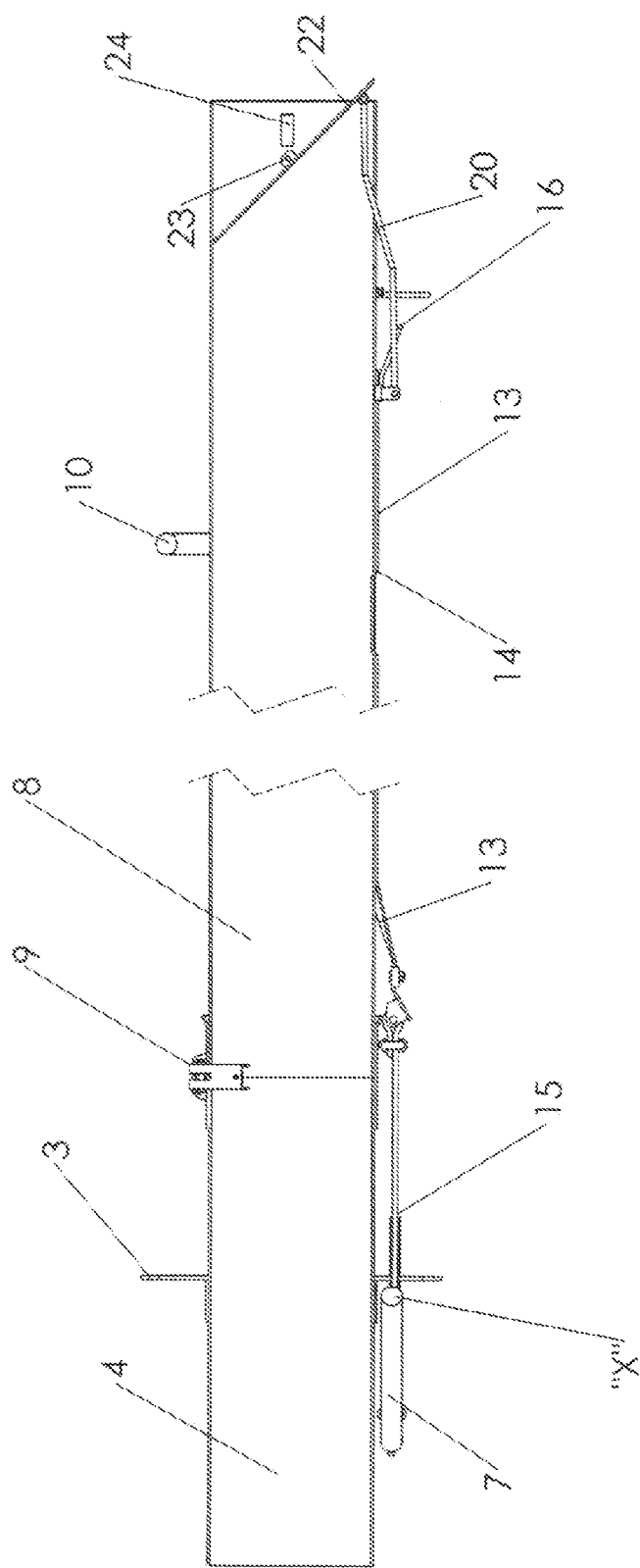
FIG. 10 is a section view of the present invention shown with the butterfly valve in a closed position and the gates in an open position.
Figure 11:
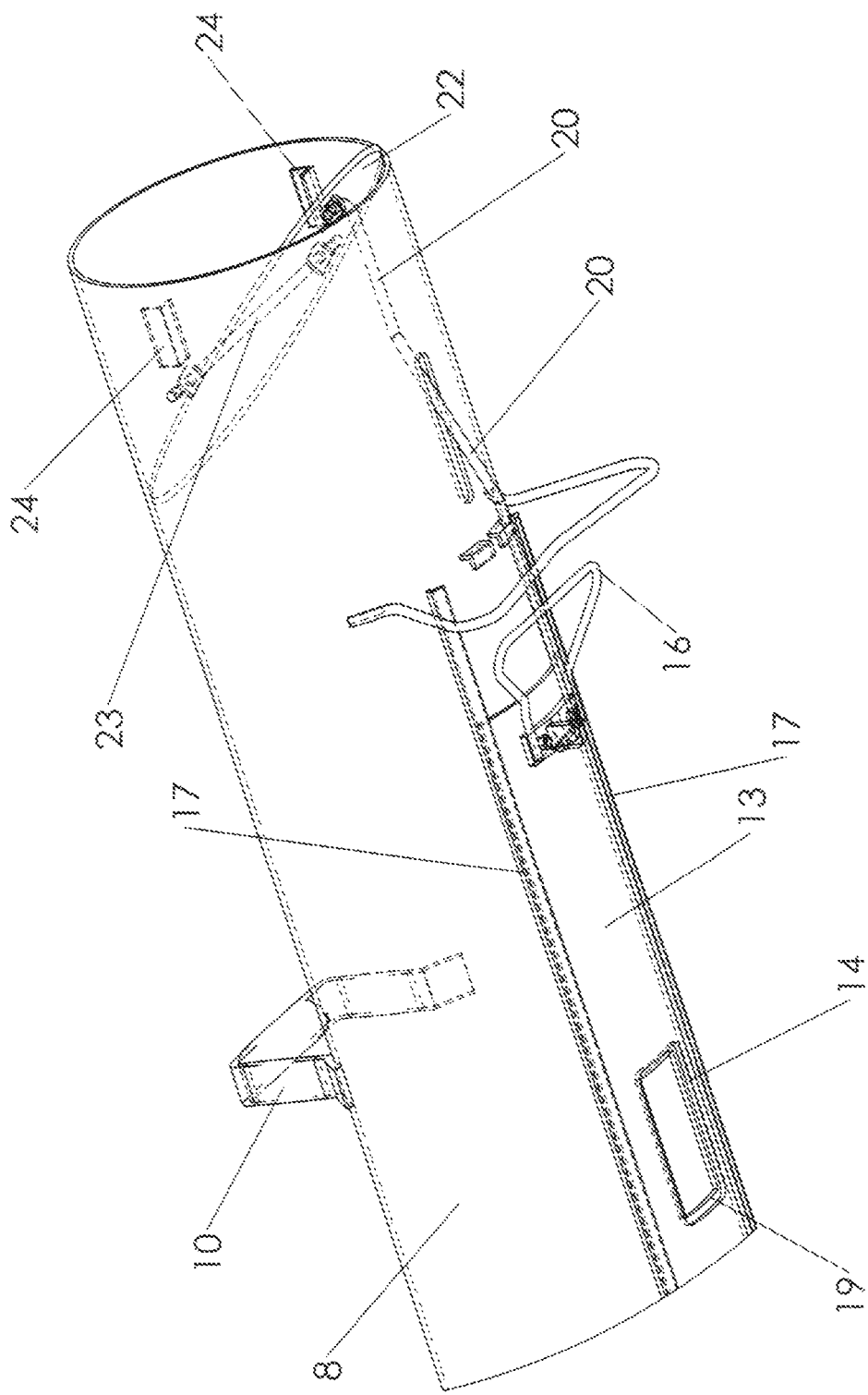
FIG. 11 is a detail perspective view of the distal (inward-most) end of the extension tube shown with the butterfly valve in a closed position.

FIG. 8 is a section view of the present invention shown with the butterfly valve in an open position and the gates in a closed position, and FIG. 9 is a detail perspective view of the distal (inward-most) end of the present invention shown with the butterfly valve in an open position. FIG. 10 is a section view of the present invention shown with the butterfly valve in a closed position and the gates in an open position, and FIG. 11 is a detail perspective view of the distal (inward-most) end of the present invention shown with the butterfly valve in a closed position.

Figure 12:
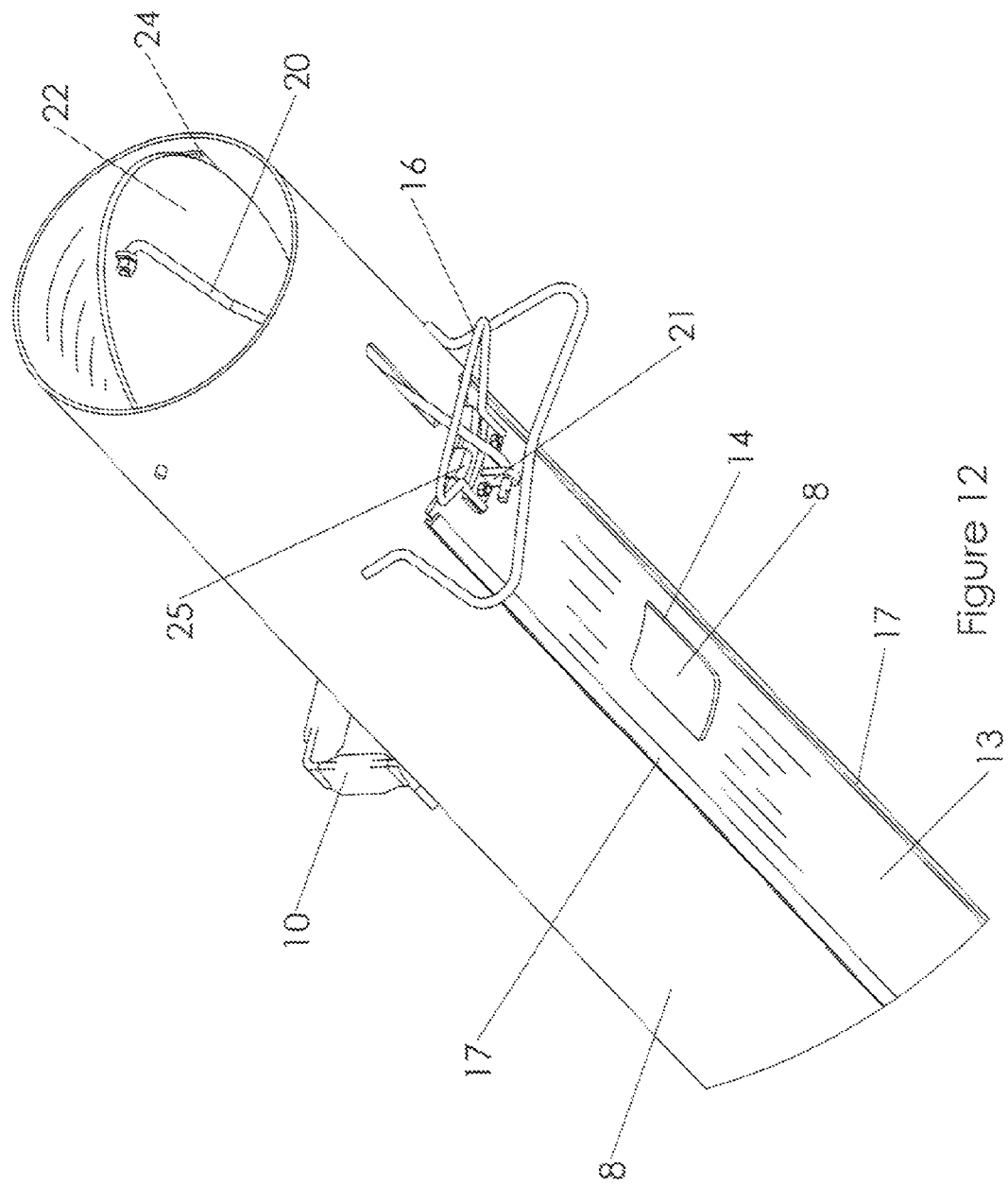
FIG. 12 is a detail bottom perspective view of the distal (inward-most) end of the extension tube shown with the butterfly valve in an open position and the gates in a closed position.

FIG. 12 is a detail bottom perspective view of the distal (inward-most) end of the extension tube shown with the butterfly valve in an open position and the gates in a closed position. When the gates are opened as described above and shown in FIG. 6, the longitudinal movement of the sealing strip 13 causes the first end of the butterfly valve actuating rod 20 (which is secured to the sealing strip 13 via a connecting bracket 21) to also move longitudinally toward the reinforcement plate 3. The second end of the butterfly valve actuating rod 20 (which is secured to the butterfly valve 12) pulls the butterfly valve into a closed position, as shown in FIG. 13.

Figure 13:
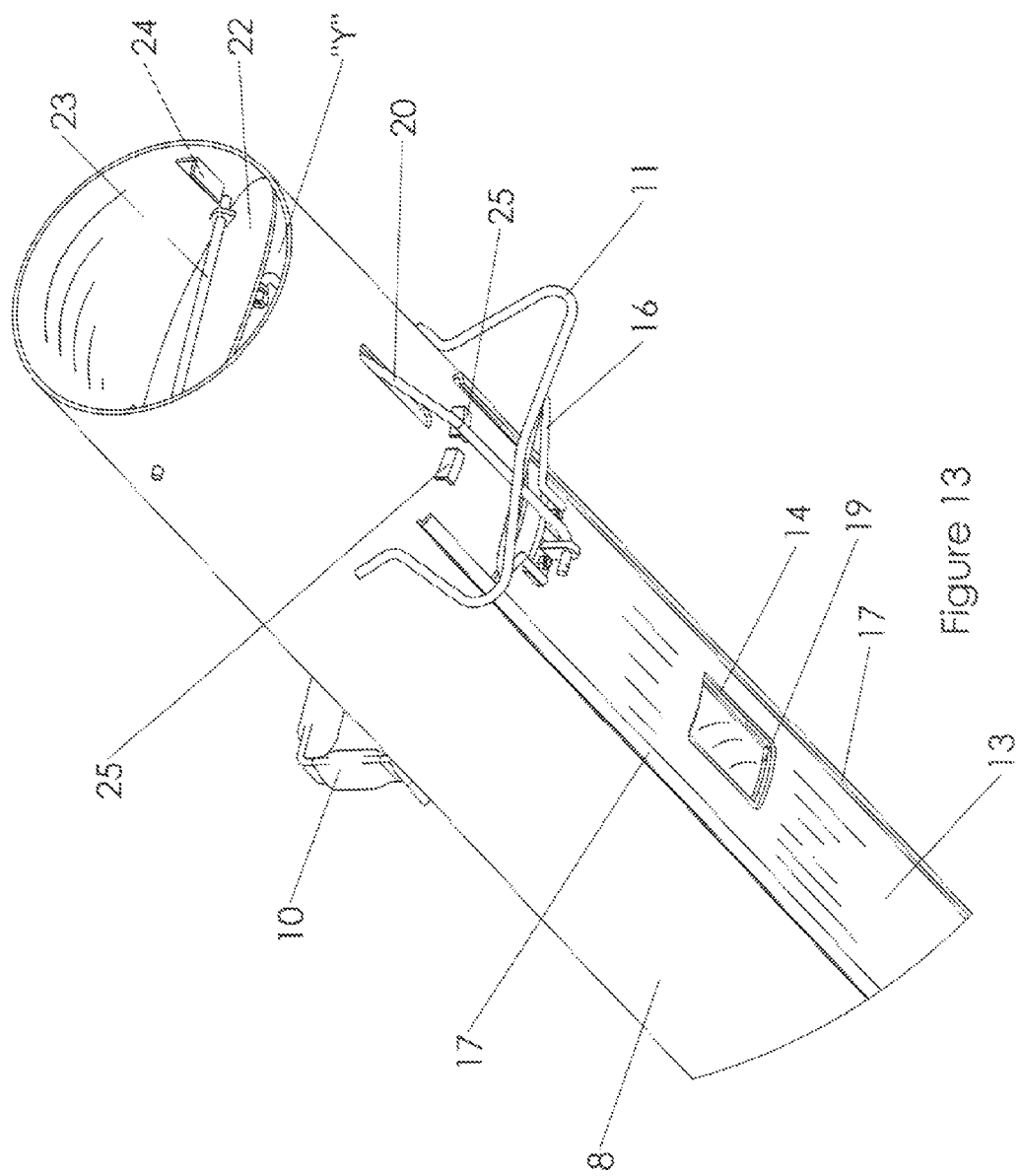
FIG. 13 is a detail bottom perspective view of the distal (inward-most) end of the extension tube shown with the butterfly valve in a closed position and the gates in an open position.

FIG. 13 is a detail bottom perspective view of the distal (inward-most) end of the extension tube shown with the butterfly valve in a closed position and the gates in an open position. The butterfly valve 12 is an elliptical disc 22 that rotates on a shaft 23 that penetrates the walls of the extension tube 8 at its distal end. A stop bracket 24 on the interior of the distal end of the extension tube 8 prevents the butterfly valve from over-rotating when the butterfly valve is returned to an open position via the return handle 16. Retaining brackets 25 on the bottom of the extension tube 8 prevent the sealing strip 13 from sliding too far toward the distal end of the extension tube 8 when the gates are returned to a closed position via the return handle 16. Note that when the butterfly valve is open, the gates are closed, and when the butterfly valve is closed, the gates are open. Note also that when the butterfly valve is in a closed position, there is still a gap (designated by a "Y" in FIG. 13) between the bottom of the butterfly valve and the inside bottom of the extension tube. This is to allow grain to continue to be sucked up through this gap at the same time that grain is being sucked up through the slots.

In operation, the extension tube 8 is inserted into the empty grain bin, as described above and shown in FIG. 3, and the bin is then filled, burying the extension tube. When the grain is to be removed, then the grain vacuum hose 5 is attached to the outlet tube 4, and the grain vacuum is turned on. Once the grain bin is filled with grain, the extension tube is not visible (because it is underneath the grain), and it is not possible to open the grain bin door 2 because the grain bin is full. At this stage, the slots are in a closed position, and the butterfly valve is in an open position, which means that the grain is being sucked up into the extension tube 8 through the distal end of the extension tube only. As noted above, the distal end of the extension tube is positioned roughly in the center of the grain bin. Once the grain has reached a level such that the distal end of extension tube 8 is visible, then the gate opening actuating lever 7 is used to align the slots 14 in the sealing strip 13 with the slots 19 on the bottom of the extension tube 8 to create openings or "gates" through which the remainder of the grain is evacuated from the bin. With the gates open, the grain is also being sucked up through the gap ("Y") at the distal end of the extension tube.

This action (of opening the gates) transfers the negative pressure created by the grain vacuum from the butterfly valve, which is situated at the center of the bin, to the gates, which evacuate grain from underneath the extension tube. Until the grain reaches a relatively low level (e.g., at the level of the extension tube or lower), it is important to evacuate the grain from an area as close as possible to the center point of the bin so as to prevent uneven pressure on the outer bin walls, which can lead to buckling or collapsing of the walls.

Figure 14:
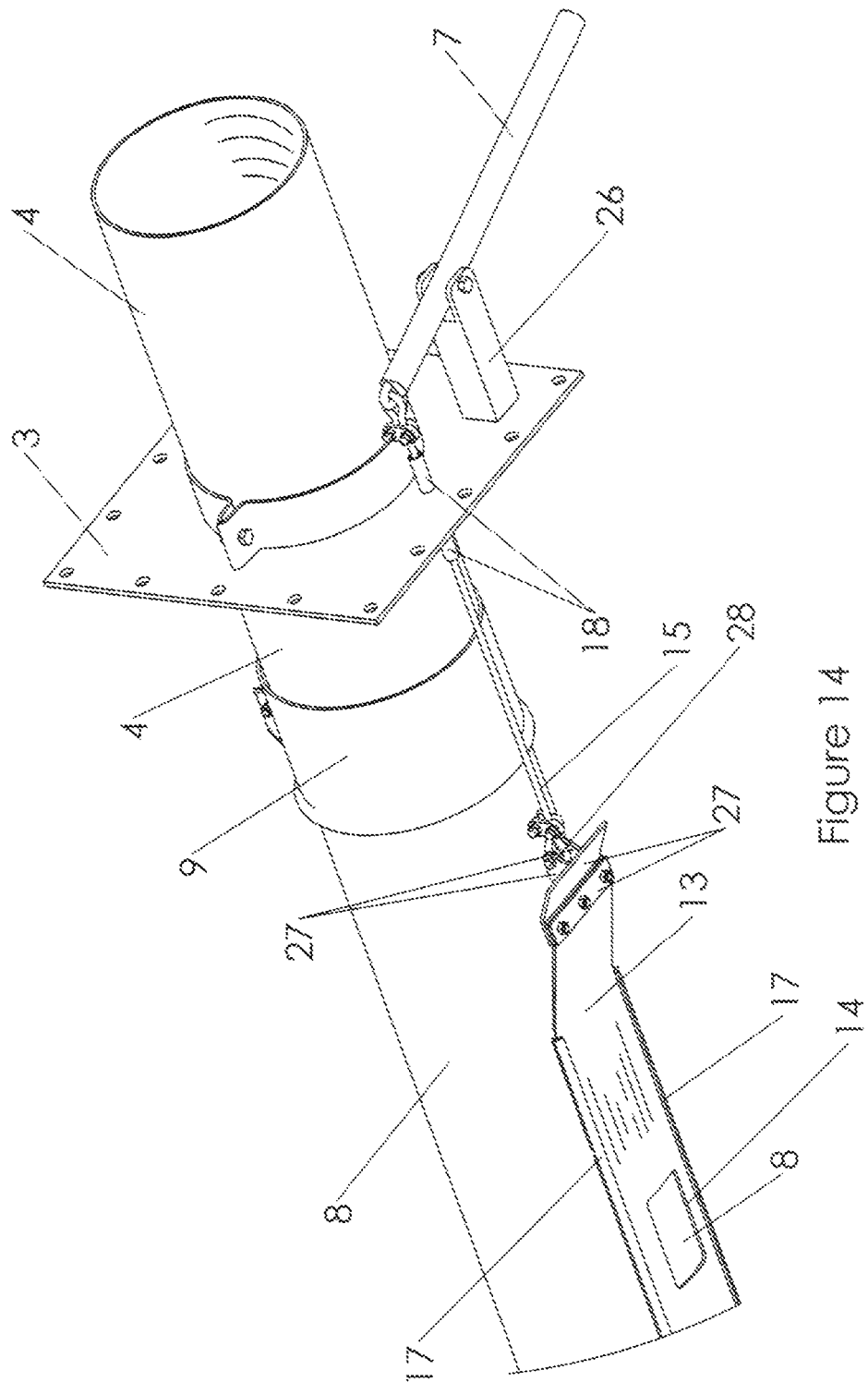
FIG. 14 is a bottom detail view of the proximal (outward-most) end of the extension tube shown with the gates in a closed position.
Figure 15:
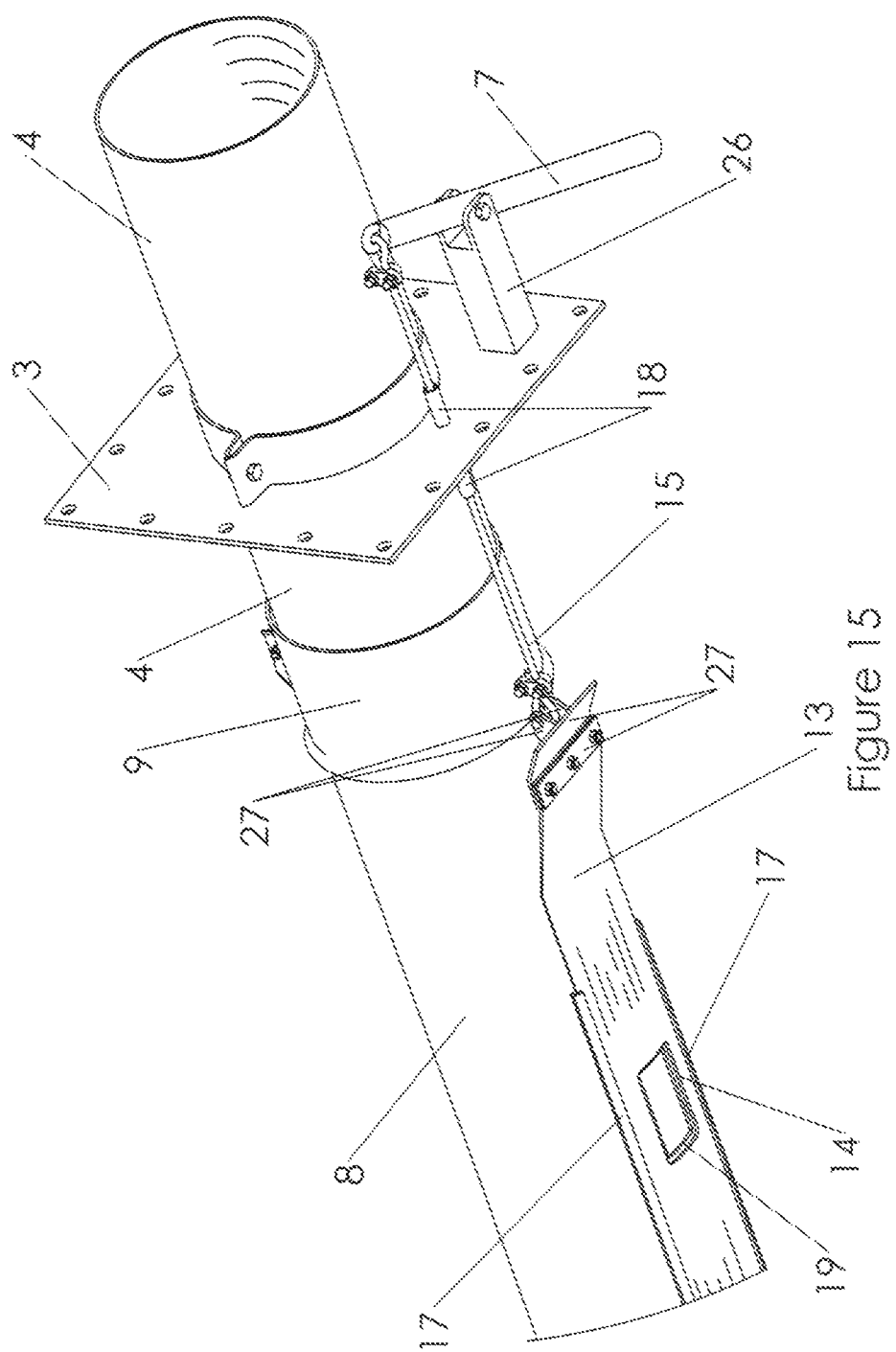
FIG. 15 is a bottom detail view of the proximal (outward-most) end of the extension tube shown with the gates in an open position.

FIG. 14 is a bottom detail view of the proximal (outward-most) end of the extension tube shown with the gates in a closed position, and FIG. 15 is a bottom detail view of the proximal (outward-most) end of the extension tube shown with the gates in an open position. As shown in these two figures, the gate opening actuating lever 7 is supported by a supporting bracket 26 that allows the gate opening actuating lever 7 to pivot. The gate opening actuating rod 15 is attached to the proximal end of the gated metal strip 13 via a metal connector 27 on the end of the sealing strip 13. The pull rod assembly comprises the gate opening actuating lever 7, the supporting bracket 26, the gate opening actuating rod 15, and the metal connector 27. To remove the extension tube 8 from the grain bin 1, the over-center band clamp 9 would be released and the extension tube 8 disengaged from the outlet tube 4; the pull rod 15 would also be disengaged from the sealing strip 13 by removing pin 28.

Figure 16:
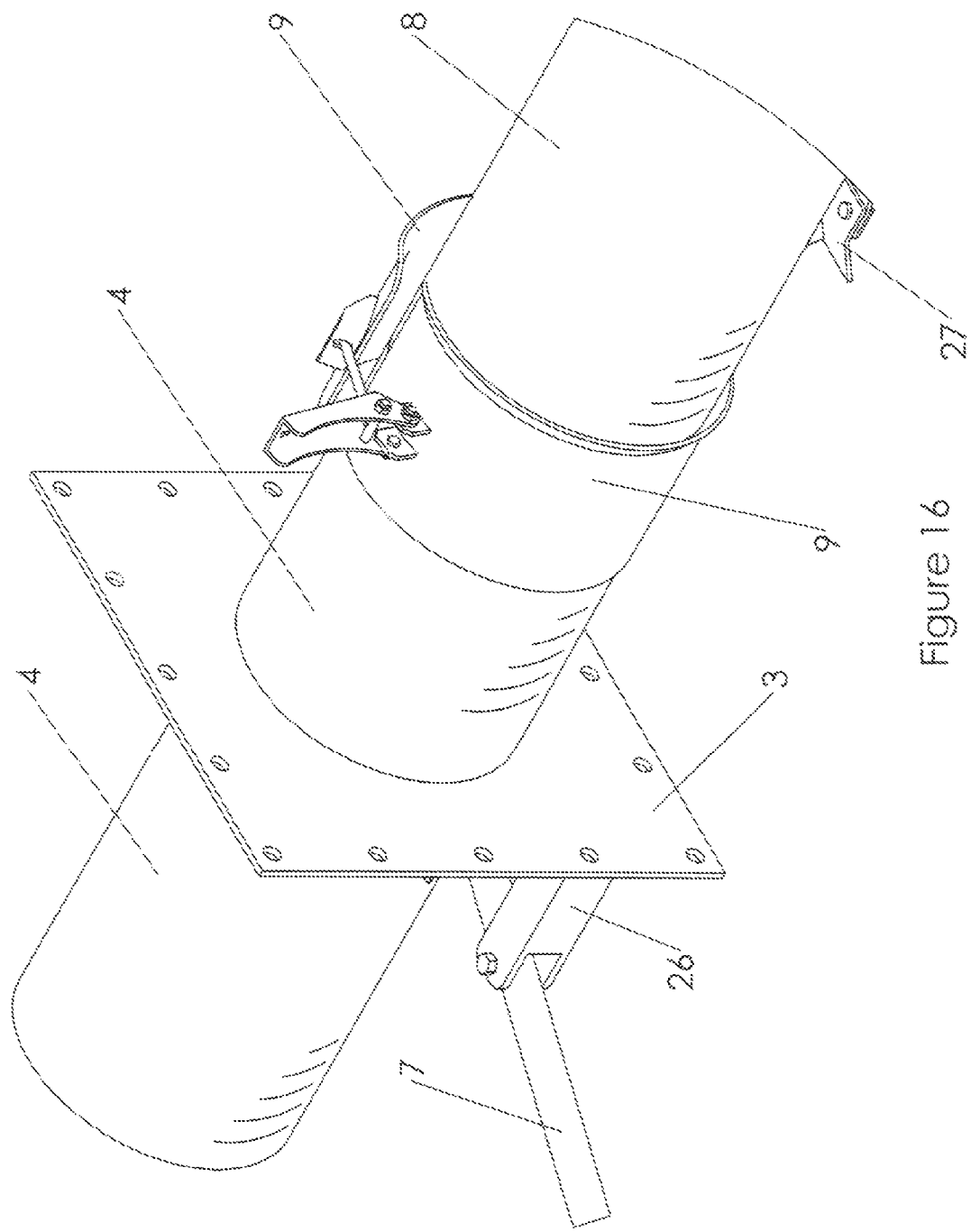
FIG. 16 is a detail view of the over-center band clamp of the present invention shown with the extension tube attached to the outlet tube.
Figure 17:
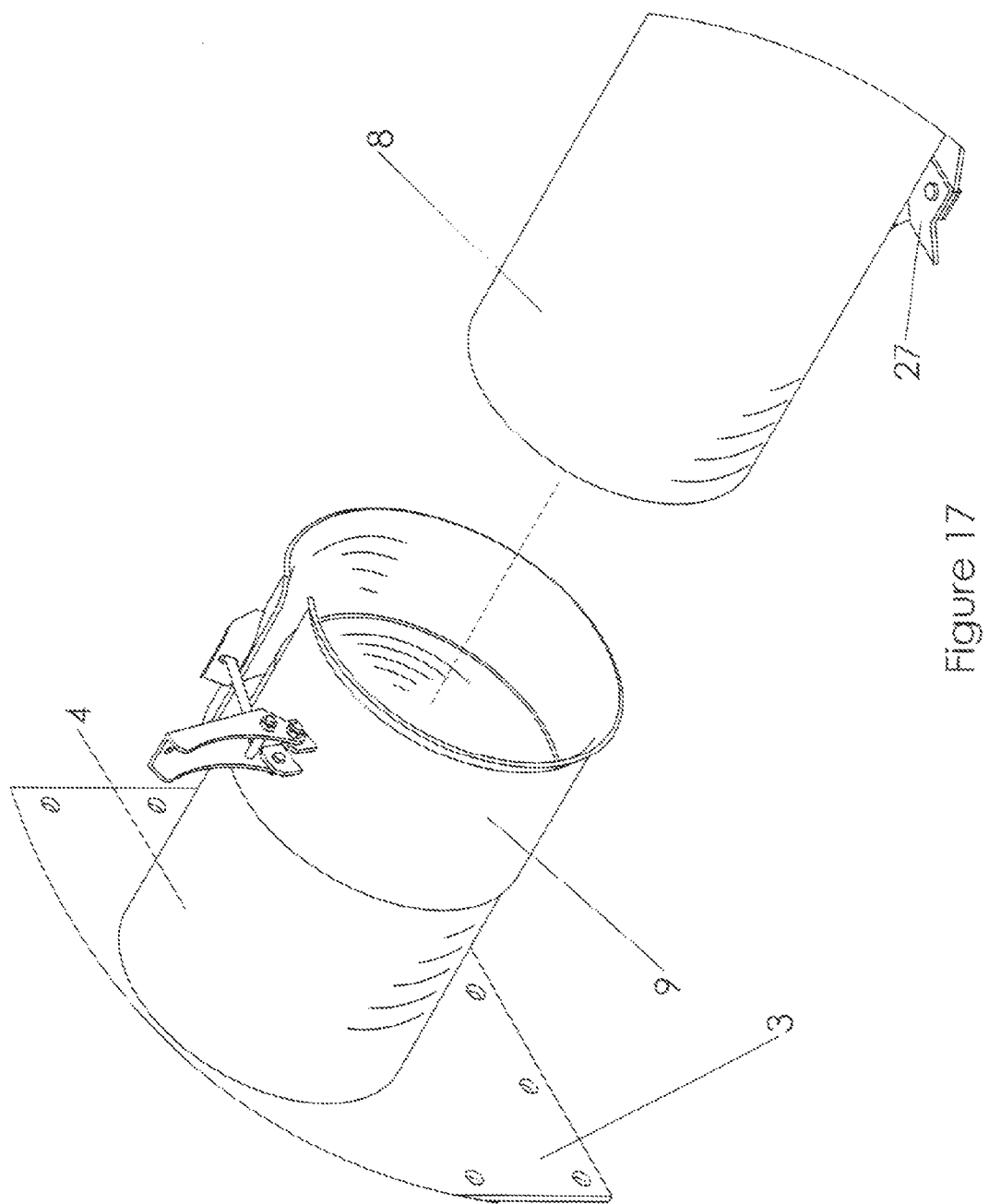
FIG. 17 is a detail view of the over-center band clamp of the present invention shown with the extension tube disengaged from the outlet tube.

FIG. 16 is a detail view of the over-center band clamp of the present invention shown with the extension tube attached to the outlet tube, and FIG. 17 is a detail view of the over-center band clamp of the present invention shown with the extension tube disengaged from the outlet tube.

Figure 18:
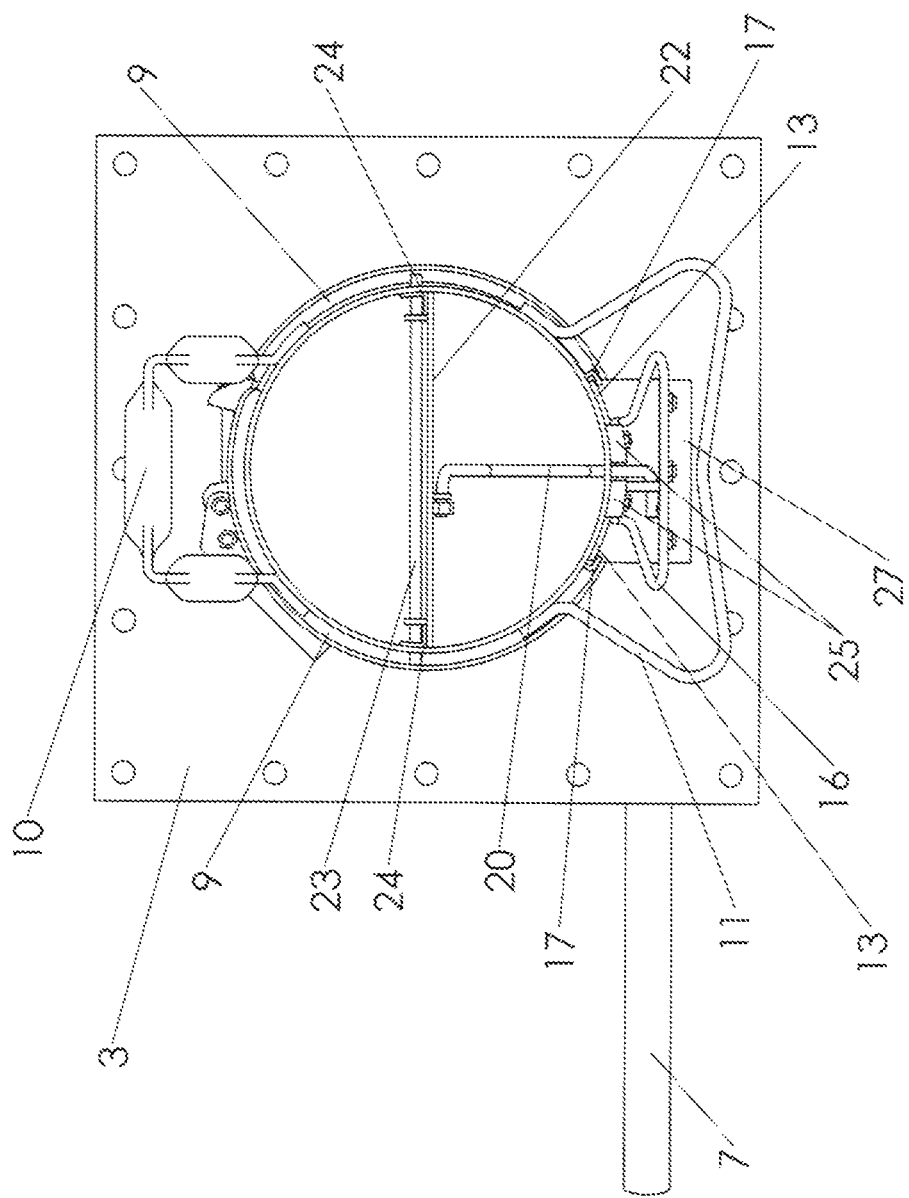
FIG. 18 is a plan view of the distal (inward-most) end of the present invention shown with the butterfly valve in an open position.

FIG. 18 is a plan view of the distal (inward-most) end of the present invention shown with the butterfly valve in an open position, and FIG. 19 is a plan view of the distal (inward-most) end of the present invention shown with the butterfly valve in a closed position.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A grain bin vacuum tube extension system comprising:
   (a) an extension tube comprising a bottom surface and a plurality of slots on the bottom surface of the extension tube;
   (b) a rubber seal that is slidably secured to the bottom surface of the extension tube and that comprises a plurality of slots, wherein the rubber seal is slidably secured to the bottom surface of the extension tube such that the slots on the bottom surface of the extension tube align with the slots in the rubber seal when the rubber seal is slid to an open position; and
   (c) a butterfly valve that is configured to close when the slots on the bottom surface of the extension tube are aligned with the slots in the rubber seal and to open when the slots on the bottom surface of the extension tube are not aligned with the slots in the rubber seal;
   (d) an outlet tube that extends through a wall in a grain bin; and
   (e) an over-center band clamp that connects the extension tube to the outlet tube.

2. A grain bin vacuum tube extension system comprising:
(a) an extension tube comprising a bottom surface and a plurality of slots on the bottom surface of the extension tube;
(b) a rubber seal that is slidably secured to the bottom surface of the extension tube and that comprises a plurality of slots, wherein the rubber seal is slidably secured to the bottom surface of the extension tube such that the slots on the bottom surface of the extension tube align with the slots in the rubber seal when the rubber seal is slid to an open position; and
(c) a butterfly valve that is configured to close when the slots on the bottom surface of the extension tube are aligned with the slots in the rubber seal and to open when the slots on the bottom surface of the extension tube are not aligned with the slots in the rubber seal;
(d) a pull rod assembly comprising a gate opening actuating lever that is attached to a gate opening actuating rod, wherein the gate opening actuating rod is attached to a first end of the sealing strip, and wherein the gate opening actuating rod passes through a wall of the grain bin; and
(e) a return handle that is attached to a second end of the sealing strip;
wherein when the gate opening actuating lever is activated, the gate opening actuating rod causes the sealing strip to move longitudinally toward the wall of the grain bin through which the gate opening actuating rod passes, thereby aligning the slots in the sealing strip with the slots in the bottom surface of the extension tube and closing the butterfly valve; and
wherein when the return handle is pulled toward a distal end of the extension tube, the sealing strip slides longitudinally toward the distal end of the extension tube, thereby opening the butterfly valve and causing the slots in the sealing strip to not be in alignment with the slots in the bottom surface of the extension tube.

3. The grain bin vacuum tube extension system of claim 2, further comprising at least one retaining bracket on the bottom surface of the extension tube to prevent the sealing strip from sliding toward the distal end of the extension tube once the butterfly valve is returned to an open position via the return handle and the butterfly valve actuating rod.

4. A grain bin vacuum tube extension system comprising:
(a) an extension tube comprising a bottom surface and a plurality of slots on the bottom surface of the extension tube;
(b) a rubber seal that is slidably secured to the bottom surface of the extension tube and that comprises a plurality of slots, wherein the rubber seal is slidably secured to the bottom surface of the extension tube such that the slots on the bottom surface of the extension tube align with the slots in the rubber seal when the rubber seal is slid to an open position;
(c) a butterfly valve that is configured to close when the slots on the bottom surface of the extension tube are aligned with the slots in the rubber seal and to open when the slots on the bottom surface of the extension tube are not aligned with the slots in the rubber seal; and
(d) a butterfly valve actuating rod with a first end and a second end, wherein the first end of the butterfly valve actuating rod is connected to an elliptical disc situated inside of the extension tube on a distal end of the extension tube, and wherein the second end of the butterfly valve actuating rod is connected to a second end of the sealing strip;
wherein when the butterfly valve is in a closed position, a gap remains between the elliptical disc and an inside bottom surface of the extension tube through which gain is evacuated.

* * * * *